United States Patent [19]
Fujii

[11] Patent Number: 5,141,410
[45] Date of Patent: Aug. 25, 1992

[54] MOTOR-DRIVEN FUEL PUMP

[75] Inventor: Shinichi Fujii, Obu, Japan

[73] Assignee: Aisan Kogyo Kabushiki Kaisha, Obu, Japan

[21] Appl. No.: 615,264

[22] Filed: Nov. 19, 1990

[30] Foreign Application Priority Data

Nov. 22, 1989 [JP] Japan ............................ 1-135920[U]

[51] Int. Cl.$^5$ ............................................. F04B 17/00
[52] U.S. Cl. .................................................. 417/423.7
[58] Field of Search ................. 417/423.7; 310/51, 239

[56] References Cited

U.S. PATENT DOCUMENTS

| 4,673,837 | 6/1987 | Gingerich et al. | 310/239 |
| 4,978,876 | 12/1990 | Koster | 310/239 |
| 5,013,222 | 5/1991 | Sokol et al. | 417/423.7 |
| 5,053,664 | 10/1991 | Kikuta et al. | 417/423.7 |

FOREIGN PATENT DOCUMENTS

| 3633479 | 4/1987 | Fed. Rep. of Germany | 417/423.7 |
| 63-24389 | 10/1988 | Japan. | |
| 63-272994 | 11/1988 | Japan. | |

Primary Examiner—Richard A. Bertsch
Assistant Examiner—Alfred Basichas
Attorney, Agent, or Firm—Dennison, Meserole, Pollack & Scheiner

[57] ABSTRACT

A motor-driven fuel pump including a cylindrical pump casing having top and bottom ends; a pump section; a motor section has a motor shaft, an armature and a commutator. A spring loaded brush has one end contacting the cummutator and a second end connected to a choke coil. A terminal plate includes one end connected to an external power supply and the other end connected to the choke coil. A cover assembly for the pump casing provides a cover body with an opening holding a bearing, and appropriate recesses for accommodating the brush, spring, and choke coil components. A valve opening through which fuel is discharged from the pump section is provided. Simplification of the steps of assembling the various parts into the cover body is accomplished.

6 Claims, 3 Drawing Sheets

MOTOR-DRIVEN FUEL PUMP

BACKGROUND OF THE INVENTION

The present invention relates to a motor-driven fuel pump having a substantially cylindrical pump casing, a motor section provided in the pump casing, and a pump section adapted to be driven by the motor section for pumping up fuel through the motor section to the outside of the pump casing. More particularly, it relates to such a motor-driven fuel pump wherein the motor section includes a commutator which contacts a brush extending in an axial direction of the motor section.

In such a motor-driven fuel pump, it is intended to reduce its outer diameter by arranging the brush so as to extend in the axial direction of the motor section is disclosed in Japanese Patent Laid-open Publication Nos. 63-272994 and 63-243489, for example.

FIG. 6 shows a construction of such a pump as disclosed in the above prior art. Referring to FIG. 6, reference numeral 101 designates a substantially cylindrical pump casing which accommodates a pump section 160 at a lower portion thereof and a motor section 170 at a middle portion thereof.

The pump section 160 includes two lower covers 107 and 108 between which a space 161 is defined. An impeller 111 is rotatably provided in the space 161. The two lower covers 107 and 108 are formed with fuel passages 113 and 112, respectively, communicating with the space 161. When the impeller 111 is rotated, fuel is sucked from the fuel entry passage 112, and is then discharged under pressure from the fuel outlet passage 113.

The motor section 170 is primarily composed of a cylindrical stator 104 fixed to an inner perephery of the pump casing 101 and an armature 103 surrounded by the stator 104. The armature 103 is rotated by motor shaft 105 which is rotatably supported at its upper and lower ends. The lower end of the motor shaft 105 is connected to the impeller 111.

Two separate covers 106a and 106b are provided to cover the upper end of the motor section 170. The first cover 106a is formed with an opening 109a for mounting a bearing 109 therein, an opening 116 for accommodating a brush 115, and a cup-shaped depression 118 for accommodating a choke coil 117. The first cover 106a is mounted over the motor section 170, the bearing 109 is fixedly mounted in the opening 109a, and the brush 115 is inserted into the opening 116 against the biasing force of a spring 124. The upper end of the motor shaft 105 is supported by the bearing 109, and the brush 115 is brought into contact with a commutator 123 fixed to an upper end of the armature 103.

Two metal plates 150 and 151 are fixed on the upper surface of the first cover 106a. After inserting the brush 115 into the opening 116 and inserting the choke coil 117 into the cup-shaped depression 118, a pig tail shaped conductor 128 of the brush 115 is connected to one end 150b of the metal plate 150, and one end 117a of the choke coil 117 is connected to the other end 150a of the metal plate 150, while the other end 117b of the choke coil 117 is connected to the metal plate 151.

After the completion of the above mentioned operations, the second cover 106b is mounted over the first cover 106a. Then, a terminal rod 121 is inserted into the second cover 106b, and one end 121a of the terminal rod 121 is connected to the metal plate 151.

Thus, a conducting line from the terminal rod 121 through the choke coil 117 and the brush 115 to the commutator 123 is formed.

In the above prior art pump, the assembly of the upper end of the motor section 170 with the first and second covers 106b and 106a, and the number of parts requires too many operations.

Furthermore, it is necessary to prevent the brush 115 from being pushed out of the opening 116 due to the biasing force of the spring 124 during the mounting operation of the first cover 106a over the motor section 170. Even though the second cover 106b is assembled with the first cover 106a before the former is mounted over the motor section 170, the above problem cannot be eliminated.

SUMMARY OF THE INVENTION

It is a first object of the present invention to provide a motor-driven fuel pump which can be simply assembled with a reduced number of parts by using a single cover for covering the top of the motor section.

It is a second object of the present invention to provide a motor-driven fuel pump wherein the top cover can be easily mounted over the pump casing without the brush falling out of the opening.

According to the present invention, there is provided a motor-driven fuel pump comprising a substantially cylindrical pump casing; a pump section provided at a lower end of said pump casing, said pump section having an impeller adapted to be rotated to suck fuel from outside of said pump casing to discharge the fuel into said pump casing under pressure; a motor section accommodated in said pump casing, said motor section having a motor shaft for rotating said impeller, an armature fixedly mounted on said motor shaft, and a commutator fixed to an upper surface of said armature; a bearing for rotatably supporting an upper end of said motor shaft; a brush having one end contacting said commutator and having a deformably extending pig tail shaped conductor; a spring for biasing the other end of said brush to make pressure contact of the same with said commutator; a terminal plate having one end to be connected to an external power supply; a choke coil having one end connected to said pig tail shaped conductor and having the other end connected to the other end of said terminal plate; and a single cover provided at the upper end of said pump casing, said cover having a cylindrical opening for fixedly mounting said bearing, a first depression for accommodating said brush and said spring, a second depression for accommodating said choke coil, and an outlet for discharging the fuel from said pump section to the outside of the pump, said first and, second depressions being cup-shaped and having a bottom, opening facing to said motor section so that said brush and said choke coil can be inserted into said depressions, said brush and said choke coil are connected together by said pig tail shaped conductor, said choke coil is connected to said terminal plate and assembly is effected under an inserted condition of said cover so that a pre-assembled cover is generated, enabling a single step pump closing operation.

The invention will be more fully understood from the following detailed description and appended claims when taken with the drawings.

DETAILED DESCRIPTION OF THE PREFERRED EMBODIMENT

Figure 1:
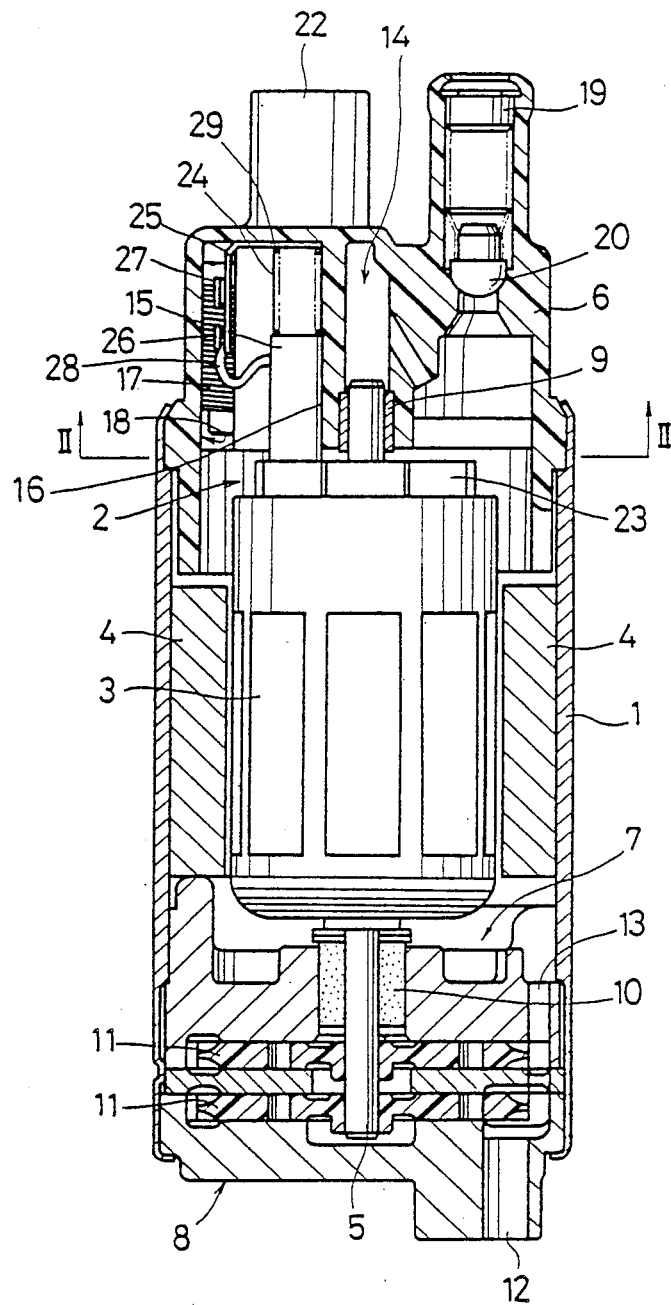
FIG. 1 is a vertical sectional view of the motor-driven fuel pump according to the present invention.

Referring to FIG. 1 which generally shows a motor-driven fuel pump in vertical section, reference numeral 1 designates a substantially cylindrical pump casing. There is provided in the pump casing 1 a motor section 2 having an armature 3 rotatable with a motor shaft 5. A cylindrical magnet 4 is fixed to an inner periphery of the pump casing 1 so as to surround the armature 3 with a given annular space defined therebetween. A single cover assembly is fixedly provided at an upper end portion of the pump casing 1, and a pump section 7 is fixedly provided at a lower end portion of the pump casing 1. The motor shaft 5 is rotatably supported at its upper end to an upper bearing 9 fixed in the cover assembly 6, and is rotatably supported at its lower end to a lower bearing 10 fixed in the pump section 7. The cover assembly 6 is fixed in position by crimping the upper end of the pump casing 1, and a lower body 8 of the pump section 7 is fixed in position by crimping the lower end of the pump casing 1. The pump section 7 includes two impellers 11 connected to the lower end portion of the motor shaft 5 below the bearing 10. The lower body 8 is formed at its lower portion with a fuel inlet opening 12 for admitting fuel into the pump section 7 owing to rotation of the impellers 11, and is also formed at its upper portion with a fuel outlet opening 13 for discharging the fuel under pressure into the motor section 2 located in the pump casing 1.

Figure 2:
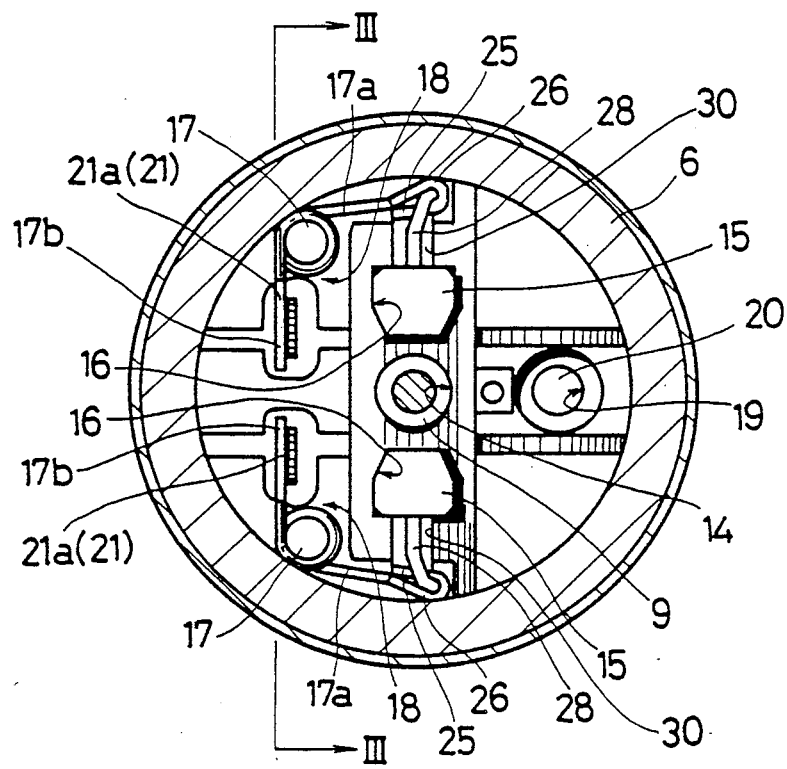
FIG. 2 is a cross section taken along the line II—II in FIG. 1.

Referring to FIG. 2 which shows a horizontal cross section of the cover 6, the cover, 6 is formed with a central cylindrical hole 14 for fixedly mounting the bearing 9 therein, a first pair of receptacles 16 arranged at opposite positions with respect to the central opening 14 for accommodating a pair of brushes-15, and a pair of receptacles 18 arranged adjacent to the holes 16 and in communicating relationship therewith for accommodating a pair of choke coils 17. The opening 14 and receptacles 16, 18 extend in an axial direction of the pump casing 1, that is, parallel to the motor shaft 5, they are open at the side facing the motor section and they end with the cover body. The cover 6a is further formed with an opening 19 extending in the axial direction of the pump casing 1 for discharging the fuel from the motor section 2 to the outside of the pump. As shown in FIG. 1, a check valve 20 for allowing upward flow of the fuel from the motor section 2 but inhibiting flow of the fuel counter to the upward flow is mounted in the opening 19.

Figure 3:
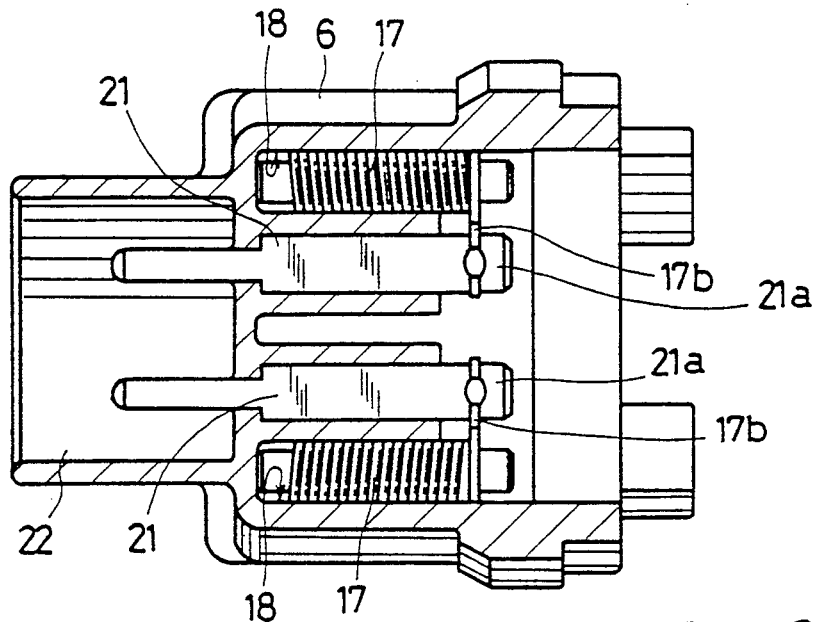
FIG. 3 is a cross section taken along the line III—III in FIG. 2.
Figure 6:
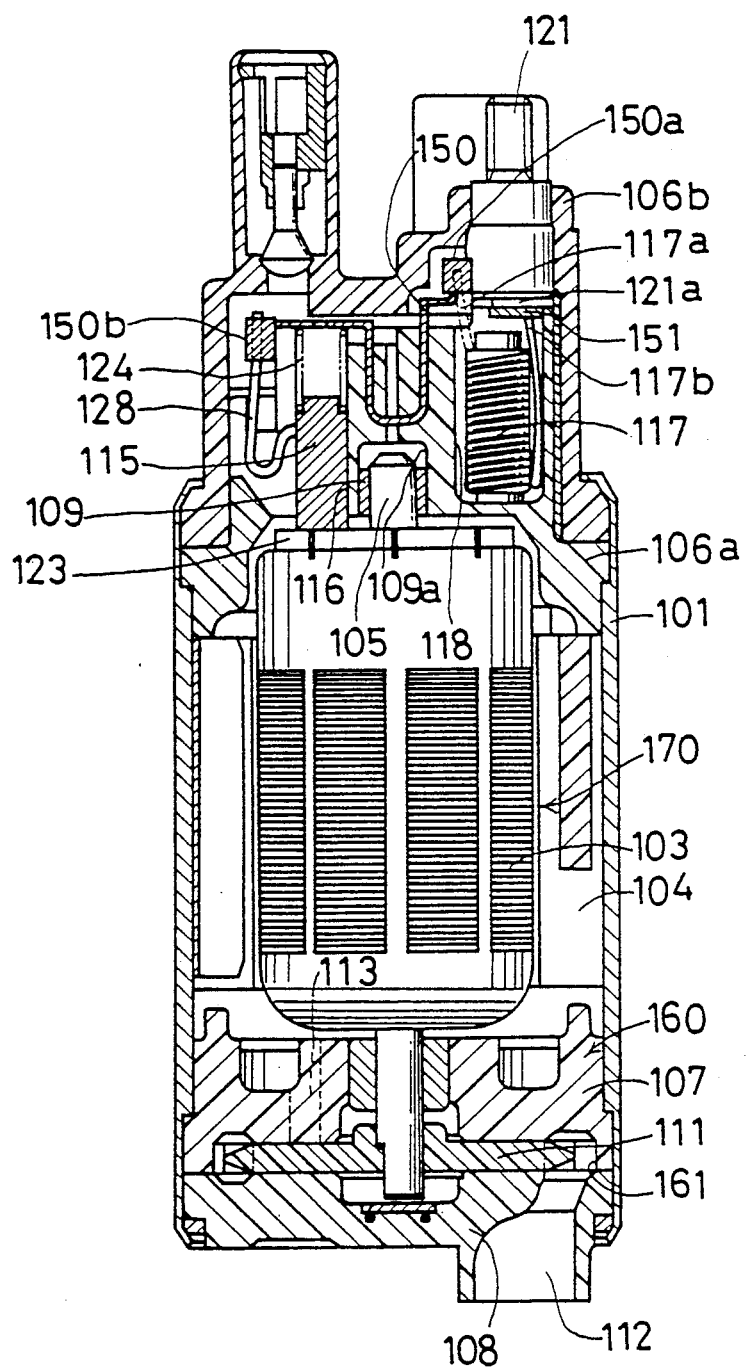
FIG. 6 is a vertical sectional view of the motor-driven fuel pump in the prior art.

Referring to FIG. 3 which is a cross section taken along the line III—III in FIG. 2. A pair of terminal plates 21 extending along a wall of the receptacles 18 are in the cover 6a by insert molding of resin. One end of each terminal plate 21 projects into a socket 22 integrally formed with the cover 6a. Referring back to FIG. 1, a pair of compression springs 24 are accommodated in the receptacles 16, so as to bias the brushes 15 against a commutator 23 fixed to an upper end of the armature 3 when assembly is completed.

The cover 6a including the brushes 15, the choke coils 17, the compression springs 24 and the terminal plates 21 represents an assembly to be mounted to the pump casing 1. The following description will be directed to each one of the brushes 15, the choke coils 17, the compression springs 24 and the terminal plates 21 since each pair thereof have the same construction. Further, the mounting of these components into the cover 6a is carried out under the condition where the top of the cover 6a as viewed in FIG. 1 is turned upside down.

Figure 5:
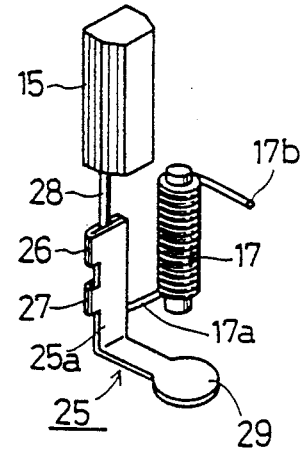
FIG. 5 is a perspective view of the assembly shown in FIG. 4.
Figure 4:
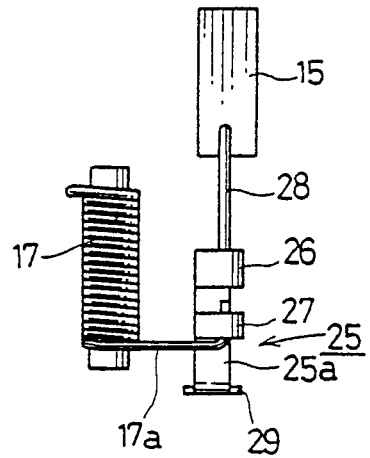
FIG. 4 is an elevational view of an assembly of the brush, the connector and the choke coil according to the present invention.

Referring to FIGS. 4 and 5, reference numeral 25 designates a connector for electrically and mechanically connecting the brush 15 to insertion the choke coil 17. Prior to of the brush 15 and the choke coil 17 into the cover 6a, an assembly of the brush 15, the connector 25 and the choke coil 17 is prepared. The connector 25 is integrally formed with a connecting portion 25a extending in a longitudinal direction of the brush 15 and a spring seat 29 projecting perpendicularly from a lower end of the connecting portion 25a. The connecting portion 25a is integrally formed with an upper hook portion 26 and a lower hook portion 27. A pig tail shaped conductor 28 of the brush 15 is nipped under pressure by the upper hook portion 26, and is welded thereto. Similarly, one end portion 17a of the choke coil 17 is nipped under pressure by the lower hook portion 27, and is welded thereto. Thus, the brush 15 is connected through the connector 25 to the choke coil 17. As is apparent from FIG. 4, the pig tail conductor 28 of the brush 15 extends upwardly from the upper hook portion 26 of the connector 25, and the one end portion 17a of the choke coil 17 extends laterally from the lower hook portion 27 of the connector 25. As will be hereinafter described, the spring seat 29 of the connector 25 is so designed as to support one end of the compression spring 24.

Under the assembled condition of the brush 15, the connector 25 and the choke coil 17 as shown in FIGS. 4 and 5, a horizontal distance between the connector 25 and the choke coil 17 is substantially equal to that between the receptacles 16 and 18. As shown in FIG. 2, the receptarles 16 and 18 are communicated with each other through a recess 30 for permitting insertion of the connector 25 upon preparing the assembly. Further, the vertical distance between the spring seat 29 and one end surface of the brush 15 against which the other end of the compression spring 24 is to abut when conductor the pig tail 28 is extended to its maximum, is shorter than the length of the fully extended compression spring 24.

At the time following the assembly of the brush 15, the connector 25 and the choke coil 17 is mounted into the cover 6a, the compression spring 24 is inserted into the receptacle 16 in the following manner. The connector 25 and the choke coil 17 are partly inserted into the holes receptacles 16 and 18 to a middle depth thereof, the compression spring 24 is inserted into the receptacle 16 from a gap defined between the opening of the receptacle 16 and the lower end of the brush 15, and is interposed under a compressed condition between the spring seat 29 and the lower end of the brush 15. While maintaining this condition, the brush 15 is inserted into the receptacle 16. When the spring seat 29 reaches the bottom of the receptacle 16, a large proportion of the brush 15 is maintained in the receptacle 16 in spite of the biasing force of the compression spring 24 since the brush 15 is connected through the pig tail conductor 28 to the connecting portion 25a of the connector 25 which is fully inserted into the recess 30. Thus, the brush 15 is inhibited from coming out of the receptacle 16.

After the assembly of the brush 15, the connector 25 and the choke coil 17 and simultaneously inserting the compression spring 24 into the receptacle 16, the other end portion 17b of the choke coil 17 is welded to an inner end portion 21a of the terminal plate 21 as shown in FIGS. 2 and 3. Thus, the choke coil 17 is fixedly positioned in the receptacle 18 by the welded connection with the terminal plate 21 which is integrally fixed to the cover 6a, and accordingly the brush 15 as well as the connector 25 is fixedly positioned in the receptacle 16 by the welded connection with the choke coil 17 through the pig tail conductor 28.

After the completion of the electrical connection between the choke coil 17 and the terminal plate 21, the cover assembly 6 is mounted to the upper end of the pump casing 1, and is fixed thereto by crimping.

In this preferred embodiment, it is preferable to preliminarily apply a tin plating on the connector 25 and a solder on the pig tail 28 and the end portions 17a and 17b of the choke coil 17, so as to easily carry out the welding.

As described above, since the cover 6 is a single integral member, it can be easily mounted to the pump casing 1. Further, since the terminal plate 21 is integrally fixed in the cover 6, and the receptacles 16 and 18 for accommodating the brush 15, the choke coil 17, the connector 25 and the compression spring 24 are formed from one end surface of the cover 6a, the construction of the cover 6a is made quite simple. In this connection, since the insertion of the brush 15, the choke coil 17, the connector 25 and the compression spring 24 as well as the connection between the choke coil 17 and the terminal plate 21 is to be carried out from the one end surface of the cover 6a, the mounting operation made is simple. Further, since the brush 15 is preliminarily assembled with the choke coil 17 through the connector 25, these components can be easily inserted into the cover 6a. After assembling these components, an electrical connection is necessary only between the choke coil 17 and the terminal plate 21, thereby reducing the possibility of imperfect connections. Additionally, until the cover 6 assembly is fixed to the pump casing 1, the compression spring 24 is supported between the spring seat 29 and the brush 15, and the brush 15 is inhibited from being pushed out of the receptacle 16 by the extended pig tail conductor 28, so that the cover assembly 6 can be easily mounted without a fear of escape of the brush 15.

Having thus described the preferred embodiment of the invention, it should be understood that numerous structural modifications and adaptations may be made without departing from the spirit of the invention.

What is claimed is:

1. A motor-driven fuel pump comprising:
   a substantially cylindrical pump casing having a lower and upper end;
   a motor section accommodated in said pump casing, said motor section having a motor shaft for rotating an armature fixedly mounted on said motor shaft, and a commutator fixed to an upper end surface of the armature;
   a pump section provided at the lower end of said pump casing, said pump section having an impeller fixedly mounted on said motor shaft to be rotated and to suck fuel from outside of said pump casing and to discharge the fuel into said pump casing under pressure;
   a complete assembly cover provided at the upper end of said pump casing, said cover assembly comprising a cover body, said cover body having a central opening for insertion of a bearing, a first receptacle for accommodating a brush and a spring, a second receptacle for accommodating a choke coil, a recess between said first and second receptacles to accommodate a connector means,
   and a discharge opening for discharging the fuel from said pump section to the outside of said pump;
   a bearing inserted into said central opening for rotatably supporting an end portion of said motor shaft;
   a brush having one end contacting said commutator and having a deformably extending pig tail shaped conductor at the other end;
   a spring for biasing the other end of said brush to make pressure contact of the same with said commutator;
   a terminal plate having one end to be connected to an external power supply;
   a choke coil having one end connected to said pig tail shaped conductor and having the other end connectable to the other end of said terminal plate; and
   said brush connector means and choke coil are preassembled as a unit and inserted into said first and second receptacles so that the connector means rests in said recess, said choke coil to said terminal plate and said spring is inserted whereby the cover assembly is complete.

2. The motor-driven fuel pump as defined in claim 1 wherein said connector means for connecting said brush to said one end of said choke coil comprises a connecting portion extending in a longitudinal direction of said first receptacle for the brush and a spring seat portion extending perpendicularly from said connecting portion for seating said spring, wherein a distance between said spring seat and said other end of said brush under a maximum extended condition of said pig tail shaped conductor is shorter than a length of said spring under an uncompressed condition thereof, so that said spring is interposed under compression between said spring seat and said other end of said brush.

3. The motor-driven fuel pump as defined in claim 2, wherein said pig tail of said brush and said other end of said choke coil are welded to said connecting portion of said connector.

4. The motor-driven fuel pump as defined in claim 2, wherein said cover body is integrally formed of resin with said terminal plate insert-molded.

5. The motor-driven fuel pump as defined in claim 2, wherein said brush is connected through said connector to said choke coil to form an assembly for positioning in said cover such that said brush is inhibited from coming out of said first receptacle and said choke coil is inhibited from coming out of said second receptacle by welding the connection of said other end of said choke coil with said other end of said terminal plate.

6. The motor-driven fuel pump as defined in claim 1 further comprising a check valve provided in said through-hole for allowing outward flow of the fuel from said pump casing to the outside thereof but inhibiting flow counter to said outward flow.

* * * * *